Oct. 25, 1938.  L. BROWN  2,134,171

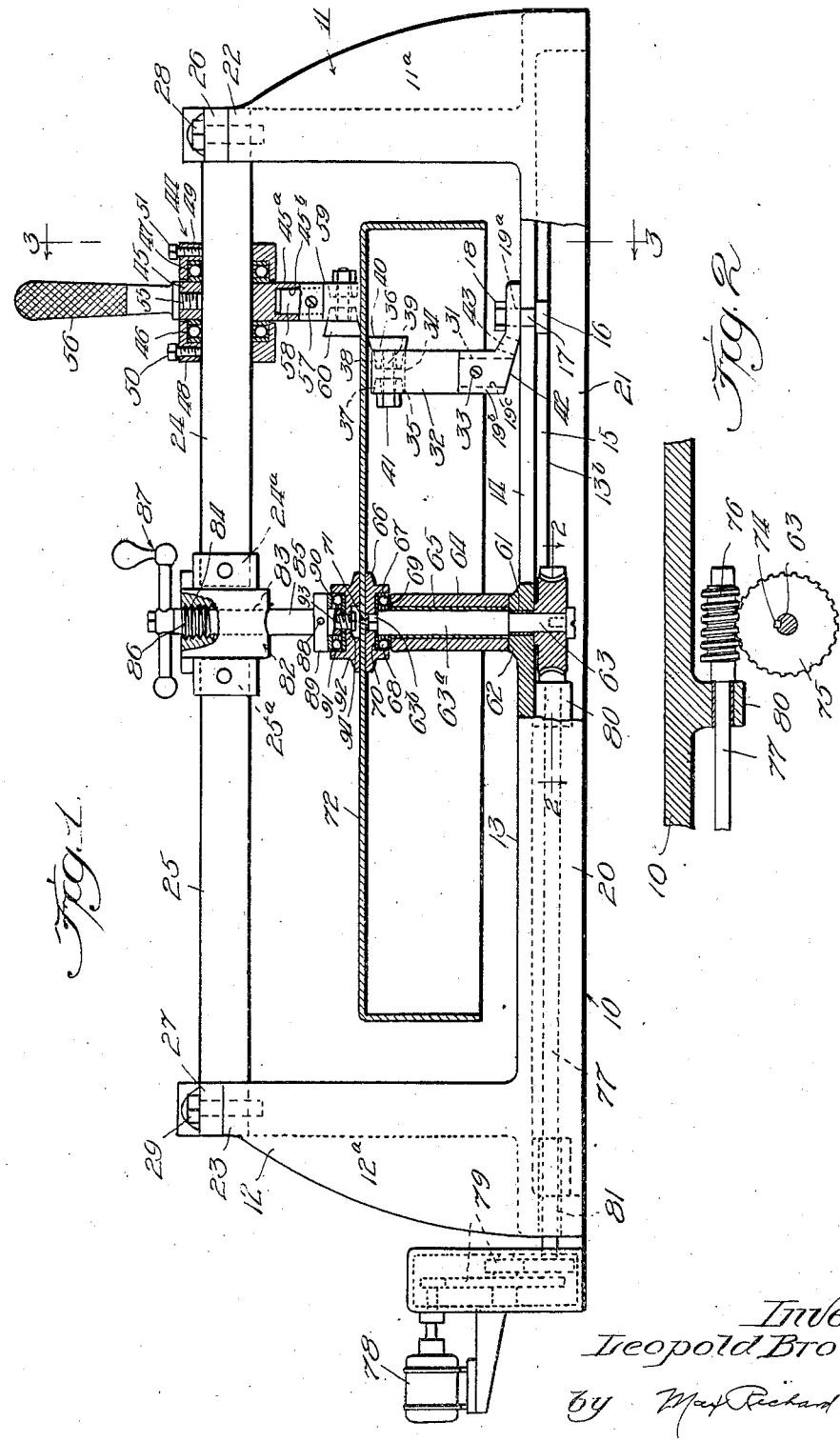

CUTTING MACHINE

Filed Feb. 1, 1937  2 Sheets-Sheet 2

Inventor:
Leopold Brown.
by Max Richard Kraus
Atty

Patented Oct. 25, 1938

2,134,171

UNITED STATES PATENT OFFICE 2,134,171

CUTTING MACHINE

Leopold Brown, Chicago, Ill.

Application February 1, 1937, Serial No. 123,327

8 Claims. (Cl. 164—63)

This invention relates to a cutting machine and more particularly to a machine for operating on flanged metal objects.

One of the objects of my invention is to provide a machine for cutting metal blanks out of flanged or like objects.

Another object of my invention is to provide a machine which can be adjusted to cut any size blank and which can accommodate flanged as well as flat metal objects.

Other objects will become apparent as this description progresses.

I have found that with the present day cutting machines it is only possible to operate upon flat metal surfaces and that flanged discs cannot be accommodated in the machine. However with my invention I provide a machine which can cut discs from either flat or flanged metal objects and wherein the size of said cut can be varied depending upon the will of the operator.

In the drawings—

Figure 1 is a longitudinal view partly in cross section showing my invention;

Figure 2 is a plan view partly in cross section taken on the lines 2—2 of Figure 1;

Figure 3:
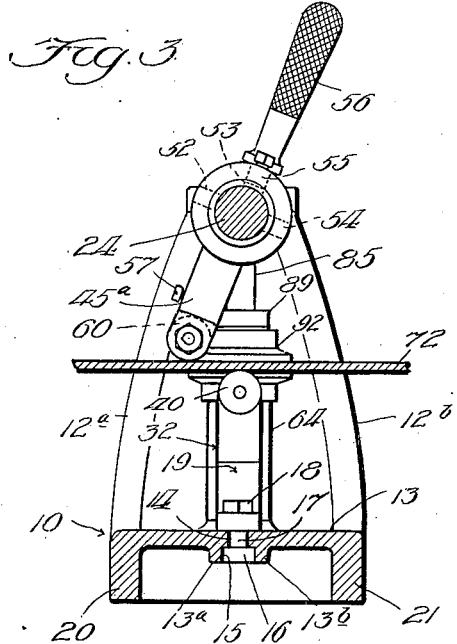
Figure 3 is an end elevational view taken on the line 3—3 of Figure 1.

In the drawings there is shown a rectangularly shaped base indicated generally at 10, having two upright standards, 11 and 12, at the opposite ends of said base. The base is provided with a flat portion 13 in which there is formed medially thereof a longitudinal recess 14 which extends approximately half the length of the machine. Underneath said recess I provide two downwardly extending flanges 13a and 13b which provide a longitudinal trackway 15 in which is adapted to be positioned the squared head 16 of the bolt 17. This bolt extends through said recess and is secured by a nut 18 to the supporting member 19 which supports the lower cutting disc presently to be described. I provide a pair of legs or supports 20 and 21 formed integrally with the base.

The upright standards 11 and 12 each comprise a pair of arms 11a and 11b, 12a and 12b which extend upwardly from the base and which are so shaped that they bend inwardly towards the top to provide semicircular supports 22 and 23 in which are adapted to rest the opposite ends of the annular shafts 24 and 25. Completing said semicircular supports are caps 26 and 27 which fit over said shafts and which are secured to said standards by bolts 28 and 29. In this manner the annular shafts are securely fastened against endwise and rotational movement in the standards. The opposite ends of said shafts 24a and 25a are fixedly secured in any suitable manner, in a block 82 which will presently be described.

The bolt 17 which is slidably secured in the base 10 passes through an opening 19a to secure the right angled cutting disc support 19 to the base. The support 19 can be moved longitudinally on the base when the nut 18 is loosened and is prevented from movement when said nut is tightened. The vertically extending section 19b of the support has an annular bore 19c in which is fitted the stem 31 of the cutting disc head 32 and which stem is secured in said bore by a set screw 33. The head has a transverse opening 34 with enlarged openings 35 and 36 at the opposite sides thereof, in which enlarged openings are secured tapered roller bearings 37 and 38 and through which extends a shaft 39. On one end of said shaft is secured the cutting disc or knife 40 and on the other end is secured a suitable retaining nut 41. To permit said cutting disc to be positioned other than parallel to said base, I provide a bevelled section 42 in the right angled support and another opening 43, shown in dotted lines in Figure 1, which permits the bolt 17 to pass therethrough and to secure said right angled support with the beveled section adjacent said base.

Supported on the shaft 24 is a movable carriage indicated generally at 44 which comprises an annular collar 45 fitting around said shaft. Positioned adjacent the sides of said collar are a pair of annular ball races 46 and 47. To encase said ball races I provide a pair of channel housings 48 and 49, within which channels rest the ball races. Each of said housings has a threaded bolt 50 and 51 which are adapted to be secured to the shaft 24 and which when secured thereto prevent endwise movement of said collar. It will be noted that the collar can be rotated about the axis of said shaft. The collar is provided with a number of spaced threaded openings, 52, 53 and 54 each of which can receive the threaded stem 55 of the handle 56 so that if desired different leverages can be obtained. The collar is provided at its lower end with an extension 45a in which there is a bore 45b within which is supported by a set screw 57 the stem 58 of the head 59 to which is secured a cutting disc or knife 60. The cutting disc 60 is supported in ball races in exactly the same manner as the cutting disc 40. As will be understood with the bolts tightened against the shaft, the cutting disc can be rocked or pivoted about the axis of the shaft by operating the handle 56 and that if it is desired to move the cutting disc lengthwise on said shaft the bolts 50 and 51 are loosened and the entire carriage can be shifted lengthwise into any desired position. As will be seen, the cutting discs 40 and 60 can be swung about the vertical axis of their supports.

Positioned approximately the center of the length of the machine, I provide an opening 61 which has a boss 62 and through which opening extends an annular shaft 63 having an enlarged annular section 63a and a squared section 63b at the top thereof. Surrounding said enlarged section is a sleeve 64 and between said sleeve and said shaft is a bushing 65. Fixedly mounted on the squared end of said shaft to rotate therewith is a supporting table 66 which has an annular channel 67 within which is suitably supported a race of ball bearings 68. The bearings riding on suitable washers 69 and 70. Extending from the squared section is a pin or projection 71 which is adapted to fit in a small opening in the metal pan 72 which is to be sheared.

Secured to the lower end of the shaft 63 as by a spline 74 is a worm gear 75 which is driven by a worm 76 supported on a shaft 77. The shaft extends outwardly of the machine and is driven by a motor 78 through a chain of suitable reduction gears, indicated generally at 79. The shaft 77 is supported at one end in a sleeve 80 extending from the base 10, and at the opposite end through an opening in the base of the casting as at 81.

Fixedly supporting the opposite ends 24a and 25a of the two shafts 24 and 25 is the block 82 which has a vertical bore 83 threaded at the top as at 84. Within said bore is a spindle 85 threaded adjacent its upper portion as at 86 to engage the threads in the block. Secured to said spindle is a handle 87 for rotating said spindle. Fixedly secured to the lower end of said spindle as at 88 is a collar 89 against which rests a race of ball bearings 90 similar to the ball bearings 68. The ball bearings are adapted to ride within the annular channel 91 of the rotatable clamping member 92 which is similar in construction to the supporting member 66. The clamping member 92 is secured to the spindle 85 by a threaded bolt 93 which engages the flange 94 of the clamping member. In this way the clamping member is free to rotate loosely about its vertical axis while the supporting table is free to rotate with the motor driven shaft 63.

As will be understood when the motor 78 drives the shaft 77 through the reduction gears 79, the shaft 65 will rotate, rotating with it the supporting table 66 on which is positioned the metal pan to be sheared. As said pan is rotating with the operator manually holding the handle 56 to maintain the knife 60 in cutting engagement, the cutting knives 40 and 60 will cut the disc out of said pan. To vary the size of the disc to be cut, the cutting knives can be positioned in any desired position by loosening the bolts 50 and 51 and bolt 17, and by sliding the knife supports on the shaft 24 and on the channel base 10.

Figure 4:
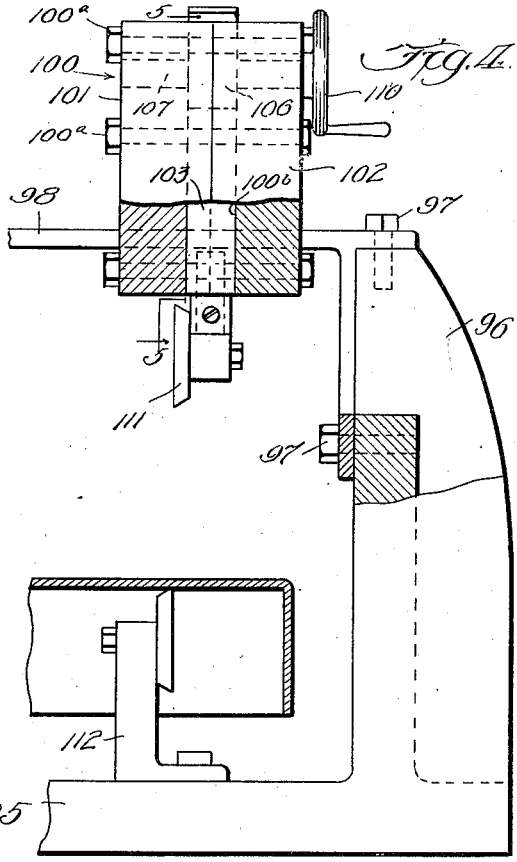
Figure 4 is a view of a modified form of the support for the upper cutting disc.
Figure 6:
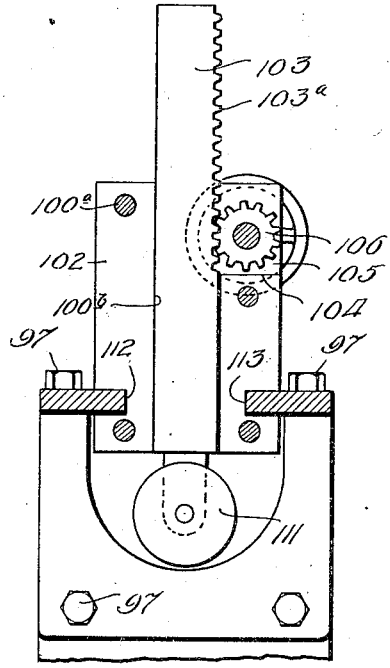
Figure 6 is a view taken on line 6—6 of Figure 5.
Figure 5:
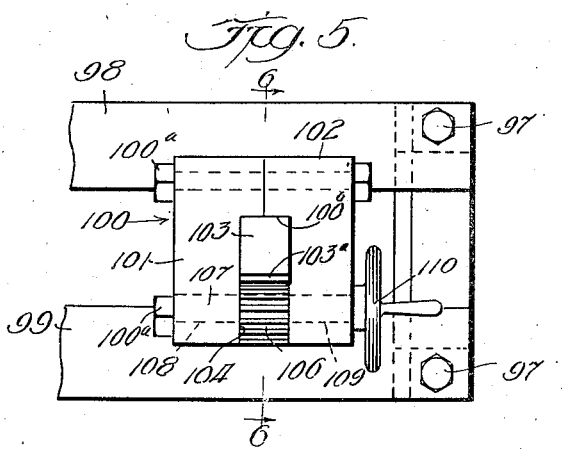
Figure 5 is a plan view taken on the line 5—5 of Figure 4.

In Figures 4, 5 and 6, I show a modified form of construction, particularly for supporting the upper cutting knife. In this construction, I provide a base 95 similar to the base 10 and an upright standard 96 to which is secured as at 97 a pair of spaced longitudinal rails 98 and 99. The opposite ends of said rails not shown being secured to an upright standard similar to standard 96. Adapted to slide longitudinally on said rails is a block 100 formed of two L-shaped sections 101 and 102 secured together by bolts 100a. The sections when joined together provide a rectangular opening 100b in which is fitted for vertical movement a rack 103 having teeth 103a. The sections are cut away as at 104 to provide a space 105 which will accommodate a pinion gear 106 which is fixedly mounted on a shaft 107 supported in said blocks as at 108 and 109. The shaft has an operating handle 110. As will be seen, by operating the handle 110 the rack is moved up or down as desired. Secured to the lower end of the rack in the same manner as shown in the previous figures is a cutting disc 111, while secured to the lower support 112 is a cutting disc secured in the same manner as the cutting disc 40. Provided in the blocks 100 are two recesses 112 and 113 which are engaged by the rails 98 and 99 so that said block can be longitudinally moved on said rails to any desired position.

The supporting table can be operated in precisely the same manner as that shown in Figures 1 to 3, while the block 82 of the clamping member can be supported on said rails by recesses similar to recesses 112 and 113.

It is understood that various modifications and changes can be made without departing from the spirit and scope of my invention.

What I desire to secure by Letters Patent is:

1. In a cutting machine of the class described comprising a rotatable supporting member, means for rotating said supporting member, a vertically movable and longitudinally rotatable clamp, a lower longitudinally movable cutting knife, a longitudinal shaft, an upper cutting member positioned on said shaft for longitudinal movement thereon independent of the movement of said lower cutting knife and for rocking movement about said shaft.

2. In a cutting machine for cutting flanged objects comprising a support for positioning a flanged object thereon, means for rotating said support, a clamping member adapted to be positioned over said object, a lower cutting knife adapted to be mounted for longitudinal movement, a longitudinal shaft, an upper cutting knife adapted to be independently mounted on said shaft and adapted to be longitudinally movable independent of the lower cutting knife, means for transversely rocking said upper knife out of engagement with the lower knife to permit insertion of the flanged object, said last mentioned means permitting positioning of said knife in cutting position.

3. In a cutting machine comprising a table for positioning a flanged object thereon, a clamping member adapted to be positioned over said object to engage it in clamping position, means for rotating said table, a longitudinal support, a cutting knife adapted to be longitudinally slidable on said support, means including a handle for rocking said knife transversely about said support to permit insertion of the flanged object, said means permitting for positioning of said knife in cutting position.

4. In a cutting machine comprising a support for positioning a flanged object thereon, a clamping member adapted to be positioned over said object to engage it in clamping position, means for rotating said support, a longitudinal member, an upper cutting knife, mounted on said longitudinal member, a lower cutting knife mounted independently of said upper cutting knife, means for transversely rocking said upper cutting knife about said longitudinal member out of engagement with the lower cutting knife to permit insertion of a flanged object, said means permitting positioning of said upper cutting knife in cutting position, and means for longitudinally varying the distance between said support and said knives.

5. In a cutting machine of the class described comprising a rotatable supporting member, means for rotating said supporting member, a vertically movable and longitudinally rotatable clamp, a lower cutting knife, a longitudinal shaft, an upper cutting knife mounted on said shaft independently of said lower cutting knife and means for transversely rocking said upper cutting knife about said shaft.

6. In a cutting machine of the class described comprising a rotatable supporting member, means for rotating said supporting member, a vertically movable and longitudinally rotatable clamp, a lower cutting knife, a longitudinal shaft, an upper cutting knife mounted on said shaft independently of said lower cutting knife, a handle secured to said upper cutting knife for transversely rocking said knife about said shaft.

7. In a cutting machine comprising a supporting table for positioning a flanged object thereon, a clamping member adapted to be positioned over said object to engage it in clamping position, an upper support for supporting an upper knife, an independently mounted lower support for supporting a lower cutting knife, a handle secured to said upper cutting knife for transversely rocking said cutting knife about its support to permit insertion of the flanged object.

8. In a cutting machine for cutting flanged objects comprising a support for positioning a flanged object thereon, means for rotating said support, a clamping member adapted to be positioned over said object, upper and lower cutting knives each freely rotatable, a support for said lower knife, a support for said upper knife, said upper support being independent of said lower support, means for transversely rocking said upper knife out of cutting position, said knives being rotatably driven by the rotation of said object.

LEOPOLD BROWN.